United States Patent [19]

Mukumoto

[11] Patent Number: 5,676,172

[45] Date of Patent: Oct. 14, 1997

[54] RELIEF VALVE

[75] Inventor: Eiichi Mukumoto, Takarazuka, Japan

[73] Assignee: Konan Electric Company Limited, Hyogo, Japan

[21] Appl. No.: 565,246

[22] Filed: Nov. 30, 1995

[51] Int. Cl.$^6$ ..................................................... F16K 17/10
[52] U.S. Cl. ........................ 137/488; 137/489.5; 137/490
[58] Field of Search ..................... 137/488, 489.5, 137/490, 491

[56] References Cited

U.S. PATENT DOCUMENTS 3,996,965  12/1976  Peters ................................... 137/625.66
5,168,895  12/1992  Voss ..................................... 251/900 X

FOREIGN PATENT DOCUMENTS 54-23474  8/1979  Japan .

*Primary Examiner*—Gerald A. Michalsky

*Attorney, Agent, or Firm*—Birch, Stewart, Kolasch & Birch, LLP

[57] ABSTRACT

The invention relates to a relief valve and intends to provide a relief valve designed to improve response and operational stability. In an overload prevention safety device in which a main valve element including a pilot valve element in a valve case is arranged, a pilot valve is opened by oil pressure exerted on the pilot valve element from an oil passage formed in the main valve element while resisting to an energizing means for energizing the pilot valve element. By this operation oil pressure is exerted on the pilot valve element side of the main valve element to open the main valve. An oil passage is designed to be constructed in holes with different diameters with a small-diameter section, a taper section, and a large-diameter section continuously arranged in that order. A pilot valve seat is sealably in contact with the pilot valve element mounted at the connections between the small-diameter section and the taper section.

9 Claims, 7 Drawing Sheets

RELIEF VALVE

BACKGROUND OF THE INVENTION

1. Field of the Invention

The invention relates to a relief valve, and more specifically, to a relief valve designed to improve the responsibility and operational stability.

2. Description of the Background Art

Hitherto, for a relief valve used for an overload prevention safety device for presses, there used is, for example, a relief valve as disclosed in Japanese Patent Publication No. Sho 54-23474, in which a main valve element and a pilot valve element are arranged in such a manner that one is brought face to face with the other, and the pilot valve element is opened while separated from the main valve element with oil pressure exerted on the pilot valve from the oil passage formed in the main valve element against an energizing means for energizing the pilot valve element. By opening the pilot valve, oil pressure is allowed to be exerted on the pilot valve element side of the main valve element, thereby driving the main valve element in the valve opening direction for parting the main valve element from the pilot valve element against an energizing means for opening the valve.

Figure 7:
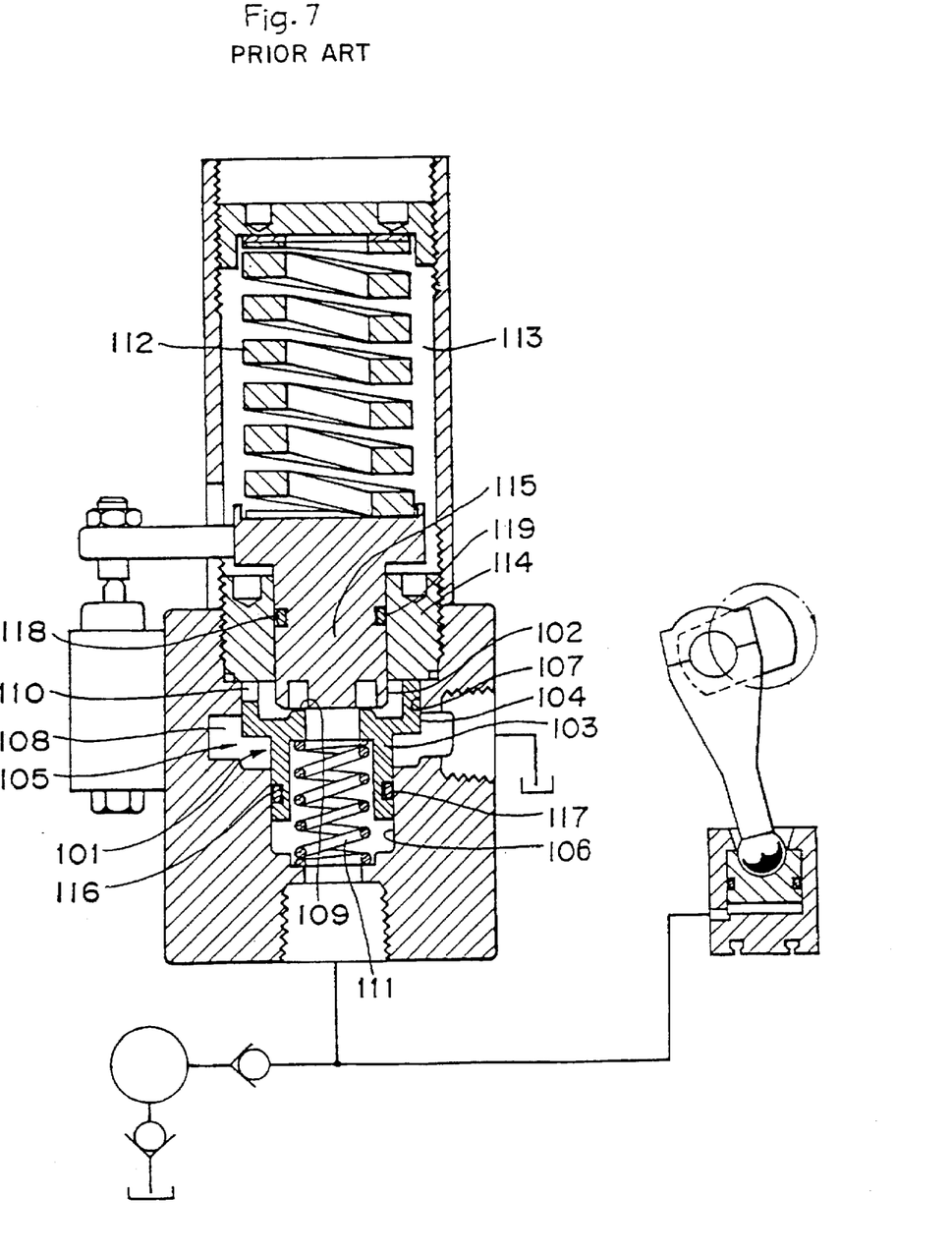
FIG. 7 is a cross section of a conventional example.

As shown in FIG. 7, in this relief valve, the main valve element 101 is formed as a stepped cylinder comprising a small-diameter cylinder 103 and a large-diameter cylinder 104 so that the main valve element 101 is able to be driven in the valve opening direction for parting it from the pilot valve element 102 against the valve closing spring 111 by oil pressure exerted on the side of the pilot valve element 102 of the main valve element 101 when the pilot valve is opened.

A main valve chest 105 for storing this main valve 101 is formed in a stepped cylindrical chamber comprising a small-diameter chamber 106 in which the small-diameter cylinder 103 is oil tight and internally-fitted, a sliding chamber 107 in which the large-diameter cylinder 104 is slidably internally-fitted, and a secondary chamber 108 formed in a diameter greater than that of the large-diameter cylinder 104 between these two chambers.

On the peripheral edge border of the small-diameter cylinder 103 of the main valve element on the large-diameter cylinder 104 side, a pilot valve seat 109 is sealably formed to receive the pilot valve element 102.

To the large-diameter cylinder 104 of the main valve, a main valve hole 110 is formed by being dented from the tip end, and this main valve hole 110 is designed to be closed with the circumferential surface of the sliding chamber 107 when the large-diameter cylinder 104 rushes into the sliding chamber 107 in a distance more than specified, and is designed to be open to the secondary chamber 108 when the large-diameter cylinder 104 advances in a distance more than specified.

This main valve element 101 is energized to the valve closing position by the valve closing spring 111, and the pilot valve element 102 is pressed against the pilot valve seat 109 of the main valve element 101 by the pressure setting spring 112.

Because the pressure setting chamber 113 for storing the pressure setting spring 112 is designed to freely communicate with the atmosphere, the pressure setting chamber and the valve chest 105 are partitioned with a bulkhead 114, and to this bulkhead 114, a member 115 made integral with the pilot valve element 102 is allowed to pass through oiltightly and free to advance or retreat.

In order to oiltightly seal the clearance between the small-diameter chamber 106 and the small-diameter cylinder 103, a groove 116 is formed on the internal circumferential surface of the small-diameter chamber 106, bringing an O-ring 117 internally fitted in this groove 116 slidably in contact with the external circumferential surface of the small-diameter cylinder 103.

In order to provide an oil tight seal the clearance between the bulkhead 114 and the member 115, a groove 118 is formed on the external circumferential surface of the member 115, bringing an O-ring 119 internally fitted in this groove 118 slidably into contact with the internal circumferential surface of the bulkhead 114.

With this conventional relief valve, since the main valve element 101 is formed in a stepped cylindrical form, when the pilot valve is open, the passage cross sectional area of the passage formed in the main valve element 101 discontinuously rapidly increases at the position where the fluid flows out from the small-diameter cylinder to the large-diameter cylinder, generating a turbulence. Pressure loss is generated with this turbulence. In addition, when the main valve is open, pressurized oil flowing from the small-diameter cylinder 103 to the main valve hole 110 flows as if it makes a U turn at the sliding chamber 107, increasing the passage resistance and generating a pressure loss.

Because these pressure losses work to close the main valve element 101, the relief pressure at which the main valve is actually opened becomes higher than the set pressure, degrading the responsibility. In addition, because these pressure losses increase as the flow rate increases, the relief pressure varies in accordance with the flow rate, resulting in an unstable operation and at the same time, if pressure is relieved due to a large flow rate when overload occurs, it produces a problem of significantly high relief pressure.

In conventional relief valves, because the main valve element 101 operates to open and opens the main valve hole 110 while resisting against the valve closing spring 111 for energizing to close the valve, it causes a problem that the response of the relief valves which release a large flow rate, in addition to the relief valve decreases.

In this conventional relief valve, in order to provide an oil tight seal the clearance between the small-diameter chamber 106 and the small-diameter cylinder 103, the O-ring 117 is used, but with the main valve closed, the contact pressure between the O-ring 117 and the small-diameter cylinder 103 is increased by oil pressure exerted from the pressurized oil passage and the sliding resistance increases. This sliding resistance slows down operation of the main valve element 101, lowering the response, and in addition, because this sliding resistance increases more when high pressure occurs, where a large-flow rate relief is required, the higher the flow rate, the higher the relief pressure, results in an unstable operation.

With this conventional relief valve, the O-ring 119 which seals the clearance between the member 115 following the pilot valve element 102 and the bulkhead 114 has the contact pressure to the external circumferential surface of the member 115 increased by internal pressure of the valve chest 105, and increases sliding resistance against advance and retreat of the member 115. This sliding resistance affects the operation of the member 115 and pilot valve element 102 when the relief pressure is set, creating a problem of degrading the setting accuracy of the relief pressure.

In addition, with this conventional relief valve, oil pressure abnormally rises due to a rise in temperature, creating another problem of malfunctioning of the relief valve under a condition other than that of a normal overload.

SUMMARY AND OBJECTS OF THE INVENTION

This invention has been made in view of the above condition, and it is the main object of this invention to provide a relief valve which improves response and operational stability.

The first relief valve according to this invention is provided with the following means to achieve the above object on the assumption of a relief valve in which a main valve element directly includes a pilot valve element and is arranged in a valve case. The pilot valve is designed to open by isolating the pilot valve element from the main valve element by oil pressure working on the pilot valve element from the oil passage. By the opening of the pilot valve, oil pressure is exerted on the pilot valve side of the main valve element, thereby driving the main valve element in the valve opening direction away from the pilot valve element.

That is, the oil passage of the main valve element is formed in holes of different diameters which have a small-diameter section followed by a tapered section in which the diameter is continuously and gradually increased, and which is further followed by a large-diameter section. At the same time, a pilot valve seat to which a pilot valve element sealably comes in contact is mounted at the connections between the small-diameter section and the taper section, and the peripheral edge of the pilot valve element is slidably fitted to the large-diameter cylinder of the main valve element so that the pressure bearing area rapidly increases when the valve opens.

On the circumferential walls of the large-diameter cylinder of the main valve element, a main valve hole is formed, and the external peripheral edge of the pilot valve element is allowed to come slidably and internally into contact with the large-diameter cylinder so that the pilot valve element can open or close the oil passage between the pilot valve seat and the main valve hole.

The second relief valve according to this invention is characterized by forming a sliding surface of a sealing member which slidably comes into contact either with the internal circumferential surface of the valve chest or with the external circumferential surface of the main valve element with a low-frictional low-sliding resistance material in order to achieve the above object with an assumption of a relief valve in which a main valve element directly includes a pilot valve element which is arranged in a valve case, the pilot valve element is isolated from the main valve element to open the pilot valve by oil pressure exerted on the pilot valve element from the oil passage formed in the main valve element while resisting against the energizing means for energizing the pilot valve element, and by opening the pilot valve. Oil pressure is exerted on the pilot valve element side of the main valve element to drive the main valve element in a valve opening direction away from the pilot valve element, and a sealing member is provided for providing an oil tight seal for the clearance between the main valve element and the valve chest internal circumferential surface, which is supported by either one of the external circumferential surface of the main valve element or the internal circumferential surface of the valve chest which stores the main valve element and which is slidably in contact with the other.

In addition, in order to improve reliability for temperature compensation by downsizing and reducing the number of functional parts, a temperature compensation orifice which enables the pilot chamber formed by the pilot valve element directly included between the pilot valve seat of the main valve element and the main valve hole and slidably fitted at the large-diameter cylinder to be in free communication with a drain passage formed downstream from the main valve hole is equipped to either the main valve element or the pilot valve element which form the pilot chamber.

In the first relief valve according to this invention, the main valve element directly includes the pilot valve element. An oil passage of the main valve element is formed in holes of different diameters comprising a small-diameter cylinder, followed by a taper section in which the diameter continuously and gradually increases, and a large-diameter cylinder section continuously following the taper section. At the same time, at the connections between the small-diameter cylinder section and the taper section, a pilot valve seat, sealably in contact with the pilot valve element, is mounted. The external circumferential edge of the pilot valve element is slidably fitted to the large-diameter cylinder section of the main valve element, thereby allowing the open pressure bearing area to rapidly increase when the pilot valve element slightly opens, increasing sharpness of the valve opening action of the pilot valve element and the main valve element, and improving the response.

In the first relief valve according to this invention, because a taper section in which the inside diameter continuously increases is equipped between the small-diameter section and the large-diameter section of the oil passage, the passage cross sectional area continuously and gradually increases between the small-diameter section and the large-diameter section, it becomes difficult for a turbulence to occur, and pressure loss due to generation of a turbulence decreases. Because oil flowing out from the pilot valve seat at the end of the small-diameter section on the large-diameter side is guided to the tapered surface when the pilot valve opens, a bend of the flow becomes considerably smaller than a right angle and the passage resistance decreases. Consequently, pressure loss due to passage resistance decreases.

In the first relief valve according to this invention, the tip end profile of the pilot valve element should only be formed in such a manner to plug the small-diameter section when it is received by the pilot valve seat. For example, it may be formed in a plane perpendicular to the advancing direction, but forming the pilot valve tip end section in a cone or frustum of a cone which has a taper circumferential surface corresponding to the oil passage taper section which can alleviate an increase of passage cross sectional area between the small-diameter section and the large-diameter section and at the same time can guide oil flowing out from the pilot valve seat along the taper section with the taper circumferential surface and achieves a further advantage in reducing pressure loss.

In the relief valve according to this invention, it is possible to form a main valve hole on the main valve element or valve chest internal circumferential surface so that the main valve element is allowed to advance or retreat and open or close this main valve element. However, in order to the reduce the delay of opening of the main valve with respect to the opening of the pilot valve, it is desirable to form the main valve hole on the circumferential walls of the large-diameter cylinder of the main valve element, to bring the external circumferential edge of the pilot valve element slidably and internally in contact with the large-diameter cylinder and to enable the pilot valve element to open or close the oil passage between the pilot valve seat and the main valve hole, and in addition, this configuration can change the flow direction of the pressurized oil passing the small-diameter cylinder of the main valve element and discharged via the main valve hole at an obtuse angle and can reduce pressure loss, and thereby achieves a further advantage.

In the second relief valve according to this invention, forming the slidably contacting surface of the sealing member for providing an oil tight seal the clearance between the main valve element and the valve chest internal circumferential surface with low sliding resistance materssliding reduce the sliding resistance and can stabilize relief pressure and at the same time sharpen the action of the main valve element.

In addition, the temperature compensation system according to this invention slightly opens the pilot valve seat to allow traces of pressurized oil to pass the temperature compensation orifice and to be simply discharged to the drain passage when pressurized oil temperature abnormally rises, preventing a malfunction of the relief valve.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION ON PREFERRED EMBODIMENTS

This invention will be described in further detail based on one embodiment shown in accompanying drawings.

Figure 6:
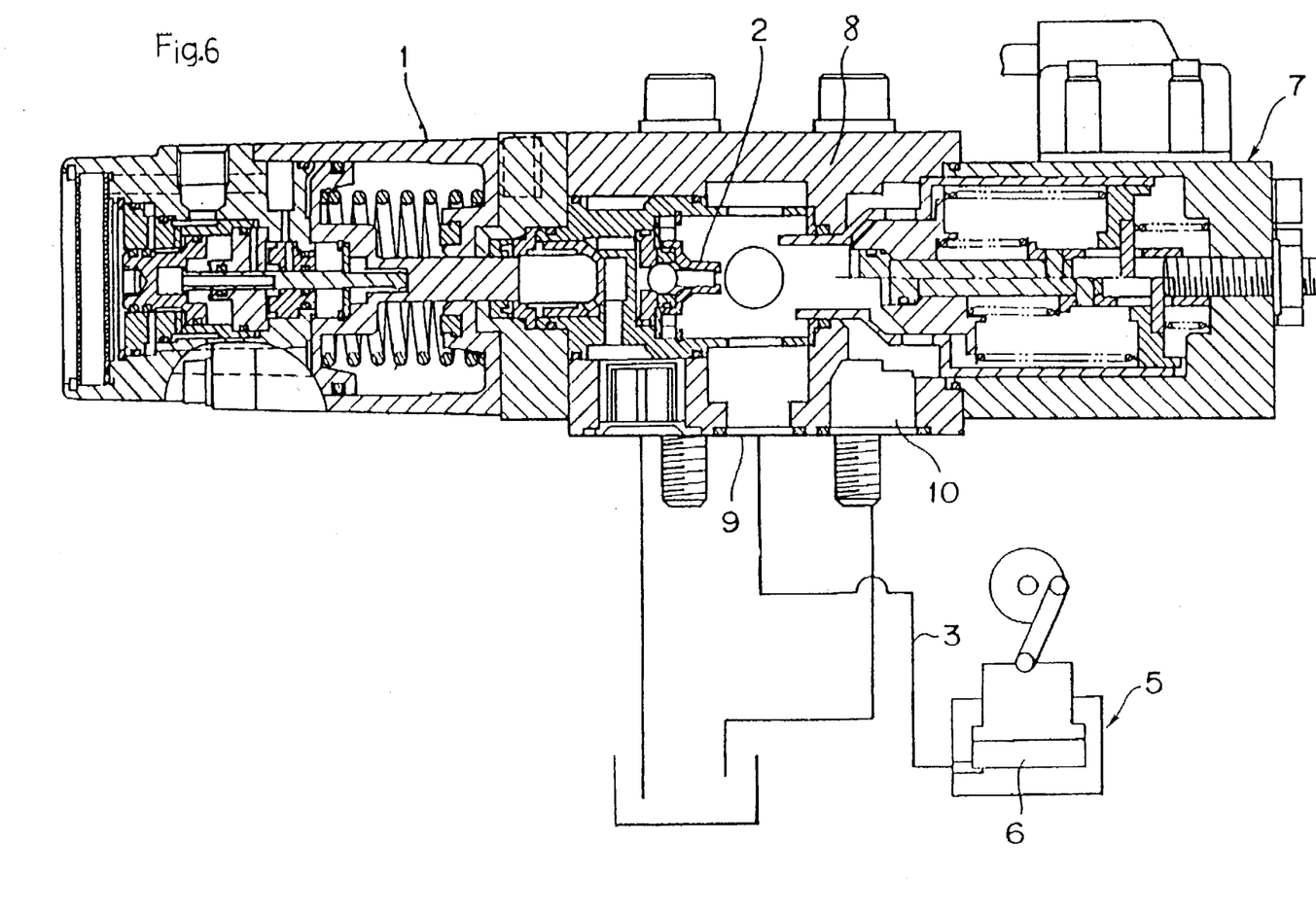
FIG. 6 is a hydraulic circuit diagram of an overload safety device for a press with this invention adopted.

The relief valve related to this embodiment is used for an overload prevention device for hydraulic equipment such as presses, and in this overload prevention device, as shown in the equivalent circuit of FIG. 6, pressurized oil is fed to a cylinder 6 formed in a slide 5 of a press via a check valve 2 and pressure oil passage 3 from a hydraulic pump 1 and a relief valve 7 is connected to this pressurized oil passage 3.

The pump 1 is designed to stop when internal pressure of the pressurized oil passage 3 and the cylinder 6 is boosted to a specified value lower than the relief pressure of the relief valve 7, achieves balance with the supply pressure, and is held to a specified pressure. When the press load is lower than the specified total load, the internal pressure of the pressurized oil passage 3 and the cylinder 6 becomes lower than the relief pressure of the relief valve 7, and when the press is overloaded, internal pressure of the pressurized oil passage 3 and the cylinder 6 exceeds the relief pressure of the relief valve 7, and the relief valve 7 opens to contract the cylinder 6, releasing pressurized oil exceeding the relief pressure to the tank, and with this operation, the overload is absorbed.

The above hydraulic pump 1 and the check valve 2 are assembled integral with the relief valve 7, and on one side surface of the valve case 8, an inlet 9 for connecting the pressurized oil passage 3 and an outlet 10 for connecting the drain passage are formed.

With respect to the operation of the relief valve 7 after pressurized oil of a specified pressure is sealed in the pressurized oil passage 3 and the cylinder 6, the hydraulic circuit on the hydraulic pump 1 side from the check valve 2 does not matter, and the detailed description will be omitted. In each of the cross-sectional views from FIG. 1 to FIG. 4 for describing the operation of this relief valve 7, to simplify the description, the hydraulic pump 1 and the check valve 2 are omitted and the primary chamber later discussed are simplified.

As shown in FIG. 1 to FIG. 4, the relief valve 7 has a valve case 8 and a main valve element 11 arranged in such a manner to directly include the pilot valve element 12 in the valve case 8 and is designed to isolate the pilot valve element 12 from the main valve element 11 with oil pressure exerted on the pilot valve element 12 via an oil passage 14 formed on the main valve element 11 from the pressurized oil passage 3 while resisting against an energizing means 13 for energizing the pilot valve element 12 to open the pilot valve, and to enable the opening of the pilot valve to allow pressurized oil to flow in the pilot chamber 51 and oil pressure to work on the pilot valve element 12 side of the main valve element 11, and to drive the main valve element 11 in the valve opening direction away from the pilot valve element 12.

The oil passage 14 formed at the center of the main valve element 11 is formed in holes of different diameters comprising a small-diameter section 15 and a tapered section 16 having a diameter which gradually increases, and a large-diameter section 17 following the large-diameter end section of the taper section 16. The pilot valve seat 18 is mounted to protrude, with which the pilot valve element 12 coming sealably in contact, with the connection between the small diameter section 15 and the tapered section 16. The circumferential edge section of the pilot valve element is slidably fitted to the large-diameter cylinder of the main valve element 11, and the opening pressure bearing area when the valve opening rapidly increases.

The external form of the main valve element 11 does not always need to correspond to the shape of the oil passage 14, and for example, may be formed in a stepped cylindrical circumferential surface with a large-diameter and a small-diameter sections, but in this embodiment, weight and inertia of the main valve element 11 are made as small as possible to increase the response, thereby corresponding to the shape of the oil passage 14.

That is, the main valve element 11 has a cylindrical small-diameter cylinder section 19, tapered cylindrical cylinder section 20, and cylindrical large-diameter cylinder section 21 continuously in that order, as well as a pilot valve seat 18 formed on the internal circumferential surface at the connections between the small-diameter cylinder section 19 and the taper cylinder section 20. To the large-diameter cylinder section 21, a main valve hole 22 opened or closed by the pilot valve element 12 is provided, and to the taper cylinder section 20, a temperature compensation orifice 23 is equipped.

The pilot valve element 12 comprises a main body 24, stem 25, and retainer spring 26, and the main body 24 comprises a tip end section 27 with a tapered circumferential surface corresponding to the taper section 16 of the oil passage 14 and a base end section 28 slidably and internally fitted into the large-diameter section 17, and the stem 25 comprises a head 29, a leg 30 formed in a smaller diameter than this, an extension pipe 31 externally fitted to the tip end of the leg 30, and a pin 32 connecting the leg 30 and the extension pipe 31.

The stem inserting hole 33 formed at the center of the main body 24 is formed in holes of different diameters with a larger diameter located on the tip end side, and to this large-diameter section, the head 29 of the stem 25 is internally fitted in an oil tight manner and free to advance and retreat, and to the small-diameter section of the stem inserting hole 33, the base end section of the leg 30 of the stem 25 is inserted free to advance and retreat.

The retainer spring 26 is inserted between the extension pipe 31 and the rear surface of the main body 24 and presses the main body 24 against the head of the stem 25. The energizing force of this retainer spring 26 is adjusted to be weaker than the energizing force of the energizing means 13.

The valve chest 34 for storing the main valve element 11 and pilot valve element 12 is formed integral and concentrically with the pressure setting chamber 35 for storing the energizing means 13 for energizing the pilot valve element 12 towards the pilot valve seat 18. The valve chest 34 is provided with a small-diameter chamber 36 to which the small-diameter cylinder section 19 of the main valve element 11 is oil tight and internally fitted as well as free to advance and retreat, and a large-diameter chamber 37 in which the taper cylinder section 20 and the large-diameter cylinder section 21 are stored free to advance or retreat.

Figure 5:
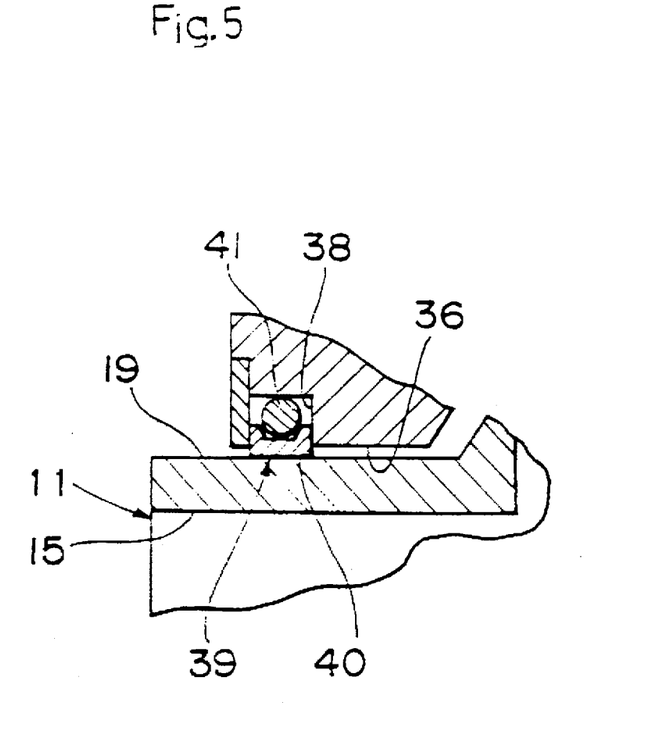
FIG. 5 is a cross section of an essential part of one embodiment of this invention.

As shown in FIG. 5, a groove 38 is formed in the small-diameter chamber 36, and by allowing the sealing member 39 inserted in this groove 38 to slidably come in contact with the circumferential surface of the small-diameter cylinder section 19 of the main valve element 11, the clearance between the small-diameter chamber 36 and the small-diameter cylinder section 19 is oil tight, and sealed.

This sealing member 39 may be constructed with, for example, O-rings, but in this embodiment, in order to reduce the sliding resistance of the main valve element 11, the sealing member 39 is composed by a sliding member 40 formed with low-frictional low-sliding resistance material, for example, tetrafluoroethylene and the like and an elastic ring 41 for pressing this against the external circumferential surface of the snail-diameter cylinder section 19.

For this elastic ring 41, commercially available rubber O-rings may be used. The sliding contact member 40 may be formed independently from the elastic ring 41 and may be constructed to be separable or it may be mounted unseparably by bonding or adhering it to the surface of the elastic ring 41.

Figure 1:
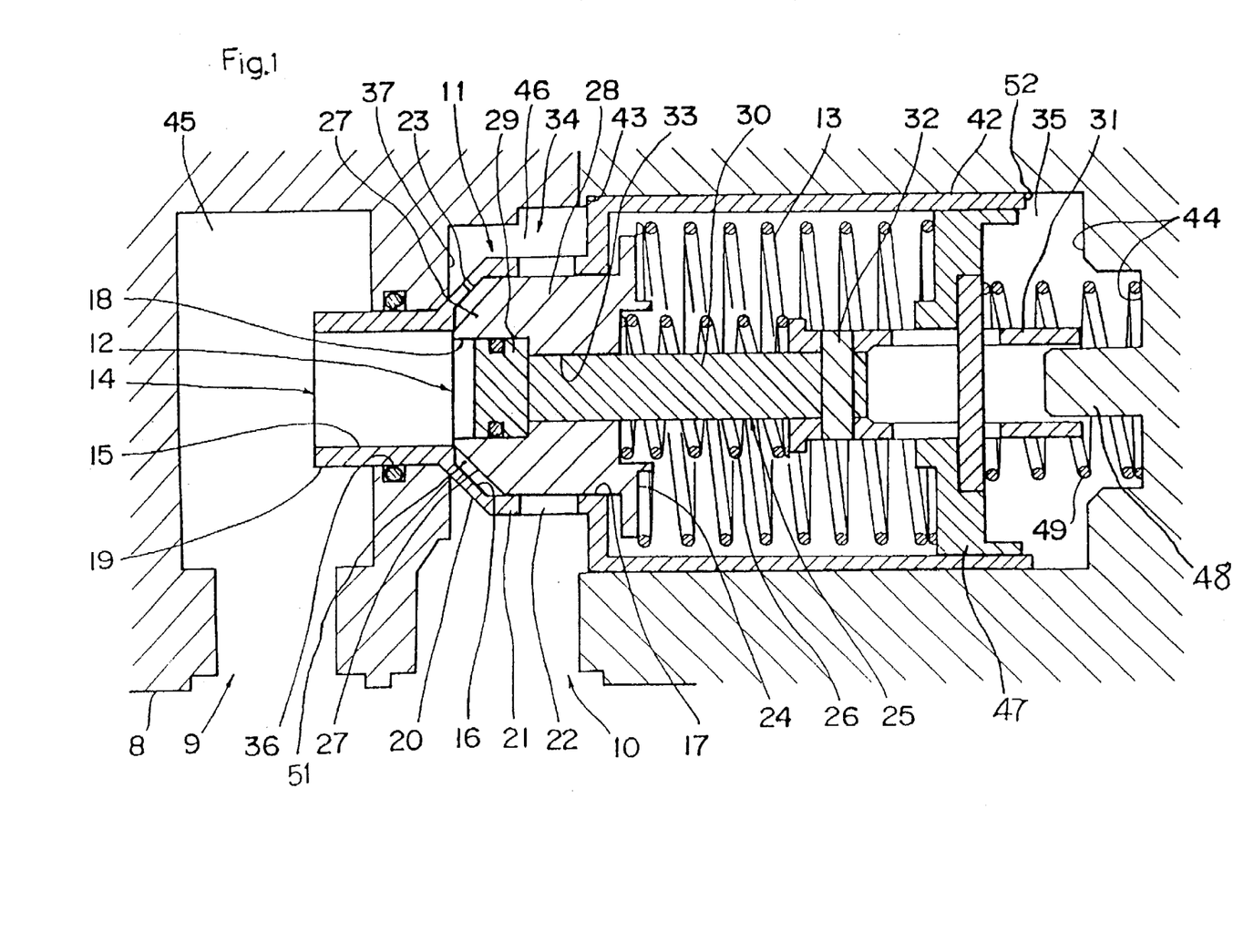
FIG. 1 is a cross section of one embodiment of this invention at no load.
Figure 2:
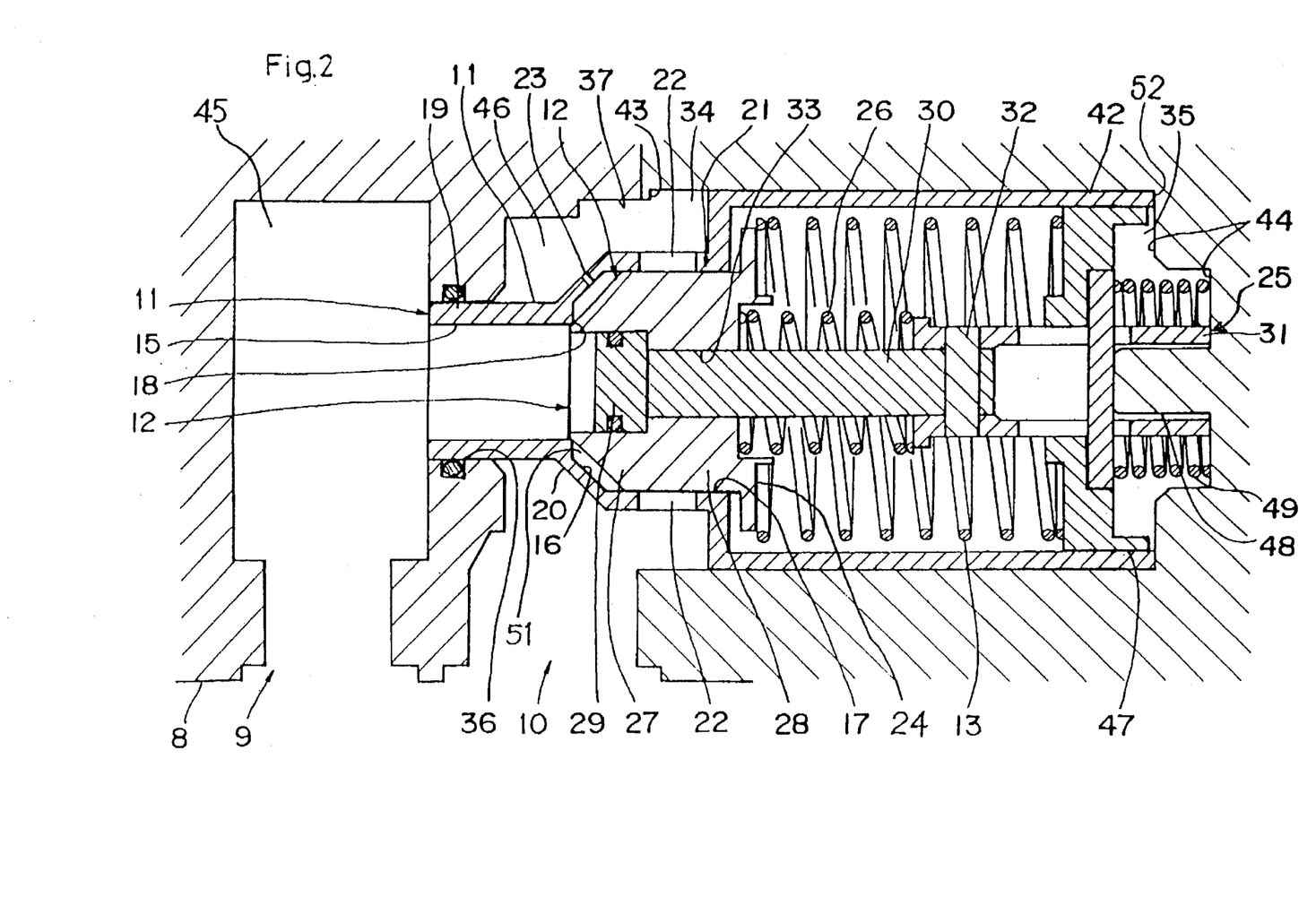
FIG. 2 is a cross section of one embodiment of this invention when relief pressure is set.
Figure 3:
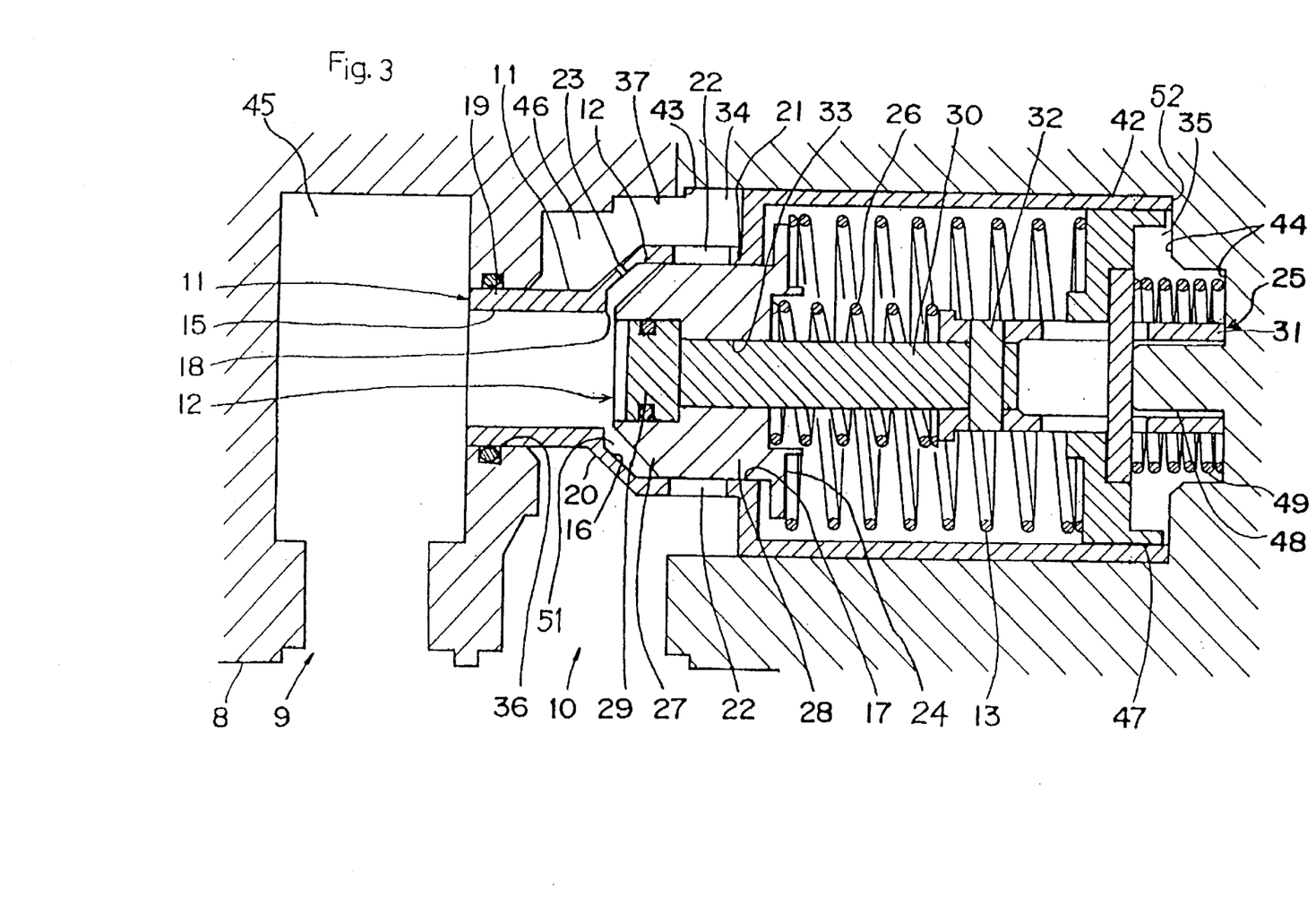
FIG. 3 is a cross section of one embodiment of this invention when the pilot valve is open with a load applied.

As shown in FIG. 1 to FIG. 3, the pressure setting chamber is formed in a hermetically sealed cylinder with the exception that the diameter is slightly larger than that of the large-diameter chamber 37 and it is in free communication with the large-diameter chamber 37. To this pressure setting chamber 35, a guide cylinder 42 continuously following the large-diameter cylinder section 21 of the main valve element 11 is slidably internally fitted. The sliding range of this guiding tube 42 is restricted by the stepped surface 43 formed at the boundary between the pressure setting chamber 35 and the large-diameter chamber 37 and an end wall 44 of the pressure setting chamber 35, thereby restricting the traveling range of the main valve element 11.

Following the small-diameter chamber 36, a primary chamber 45 in free communication with the said inlet 9 is formed, and the tip end of the small-diameter cylinder 19 is allowed to come in and out to and from this primary chamber 45.

In the large-diameter chamber 37 or pressure setting chamber 35, a secondary chamber 46 partitioned with the main valve element 11 and the guiding tube 42 is formed, and this secondary chamber 46 is in free communication with the outlet 10.

The energizing means 13 to be stored in the pressure setting chamber 35 may be composed with compressed air, pressurized oil, pressurized water, and other pressurized fluid to be fed to the pressure setting chamber 35, a piston receiving the pressure, and a spring energizing the piston while resisting against the pressurized fluid, but in this embodiment, the energizing means 13 is composed by a spring that ensures highly stable energizing force.

Consequently, in order to adjust the energizing force of this energizing means, a retainer spring 49 is inserted between the support seat 47 and the end wall 44 of the pressure setting chamber 34. The elasticity of this retainer spring 49 is set weakly enough to be negligible as compared to the energizing means 13.

When internal pressure of the primary chamber 45 of this relief valve 7 is zero (no load), as shown in FIG. 1, the support seat 47, energizing means 13, and pilot valve element 12 are pressed towards the valve chest 34 side by the energizing force of the retainer spring 49 and the front end of the guiding tube 42 is supported on the stepped surface 43. With this operation, the main valve element 11 and the guiding cylinder 42 are pressed against to the stroke end on the side of the primary chamber 45.

With respect to the relief pressure, the internal pressure of the primary chamber 45 is slowly increased to a specified relief pressure, and thereafter, is set by operating the set pressure adjusting screw 48 while filling compressed oil to the primary chamber 45 so that it is held to a specified relief pressure.

That is, by filling compressed oil to the primary chamber 45 as shown in FIG. 2, oil pressure is exerted and presses the main valve element 11 and the pilot valve element 12 into the pressure setting chamber 35 side, the retainer spring 49 is yielded to this oil pressure, and the main valve element 11, pilot valve element 12, energizing means 13 and support seat 47 retreat.

If the cross sectional area of the small-diameter section 15 is made bigger than the area (cross sectional area) of the end face of the small-diameter cylinder section 19 of the main valve element 11, a larger hydraulic thrust can be exerted on the pilot valve element 12 than on the main valve element 11, and the pilot valve element 12 can be pressed in more strongly than the main valve element 11. However, because the pilot valve element 12 is energized by the energizing means 13 and retainer spring 49, the hydraulic thrust which the pilot valve element 12 receives and that which the main valve element 11 receives are absorbed by the energizing force of the energizing means 13 and the retainer spring 49 if the thrust is lower than the specified pressure (internal pressure of the primary chamber 45 at full load of the press). The main valve element 11, pilot valve element 12, energizing means 13 and support seat 47 retreat with the main valve element 11 held supported to the pilot valve element 12, and eventually, as shown in FIG. 2, the support seat 47 is received by the set pressure adjusting screw 48.

Thereafter, if oil pressure exerted on the main valve element 11 and the pilot valve element 12 from the primary chamber 45 side is stronger than the elasticity of the energizing means 13 when the internal pressure of the primary chamber 45 is increased to a specified relief pressure, the main valve element 11 and the pilot valve element 12 further retreat after the support seat 47 is received by the set pressure adjusting screw 48, and eventually, the stem 25 of the pilot valve element 12 is received by the end walls 44 of the pressure setting chamber 35.

With this configuration, oil pressure exerted on the head 29 of the stem 25 is received by the end walls 44 of the pressure setting chamber 35, and if oil pressure exerted on the main body 24 from the primary chamber 45 side is stronger than elasticity of the energizing means 13, the main body 24 and main valve element 11 retreat to the pressure setting chamber 35 side.

Thereafter, if oil pressure exerted on the main body 24 from the primary chamber 45 side is stronger than the elasticity of the energizing means 13 when the retreat of the main valve element 11 is restricted by the end wall 44 of the pressure setting chamber 35, the main body 24 only further retreats and the main body 24 is isolated from the pilot valve seat 18, and the pilot valve opens as shown in FIG. 3.

Figure 4:
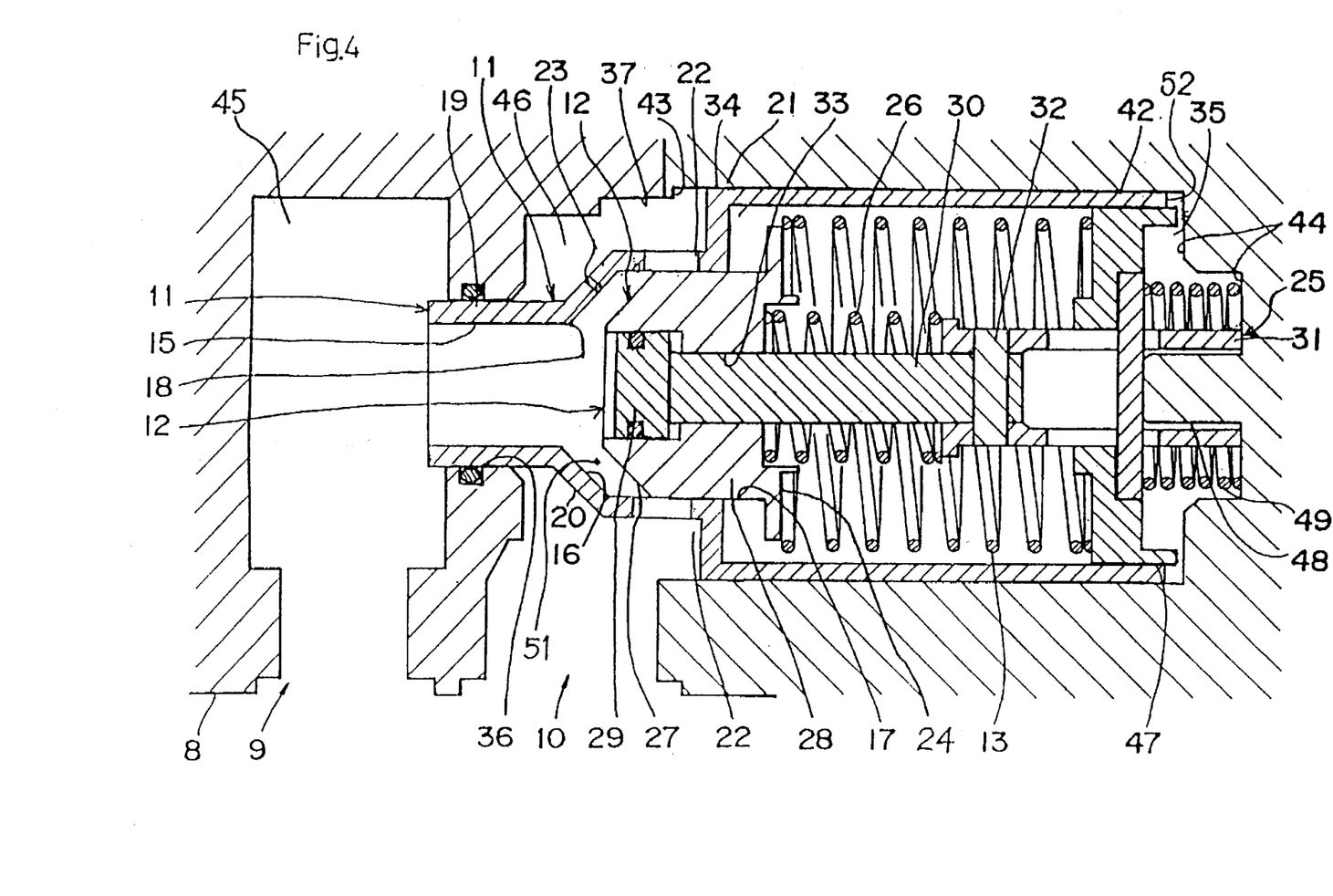
FIG. 4 is a cross section of one embodiment of this invention when the main valve hole is open with a load applied.

As shown in FIG. 3, opening of the pilot valve allows pressurized oil to flow in to the pilot chamber 51, the opening pressure bearing area of the main body 24 of the pilot valve element 12 rapidly increases, the main body 24 of the pilot valve element 12 rapidly opens fully at low inertia and retreats to the pressure setting chamber 35 side to set relief pressure. As shown in FIG. 4, simultaneously, in the main valve element 11, oil pressure thrust in the valve opening direction exerted to the taper section 16 with a greater pressure bearing area more rapidly increases than the oil pressure thrust in the closing direction exerted on the end of the small-diameter cylinder section 19 with a snail pressure bearing area, the main valve element 11 rapidly opens fully, rapidly moves greatly in the primary chamber 45 side, opposite to that of the pilot valve element 12, and rapidly opens fully the main valve hole 22 in both opposite directions, thereby releasing a large volume of pressurized oil on the primary chamber 45 side quickly from the main valve hole 22 to the secondary chamber 46. In this event, the pilot valve element 12 has a role to provide high relief pressure setting accuracy, and the main valve element 11 has a role to release a large volume of pressurized oil quickly, exhibiting high relief performance that enables high-accuracy relief pressure setting and releasing a dramatically large-volume of fluid.

In this event, tightening the set pressure adjusting screw 48 to push out the support seat 47 to the valve chest 34 side with an internal pressure of the primary chamber 45 held to the relief pressure, increases the energizing force of the energizing means 13 and allows the main body 24 to approach to the pilot valve seat 18. By pushing out the support seat 47 to the valve chest 34 side until the main body 24 comes in contact with the pilot valve seat 18, the energizing force of the energizing means 13 can be set so that internal pressure of the primary chamber 35 can be released from the temperature compensation orifice 23 to the secondary chamber 46 when it is boosted over the relief pressure.

After setting the relief pressure, for example, it is possible to connect the relief valve to the pressurized oil passage 3 in free communication to the cylinder 6 of the press as shown in FIG. 6, and pressurized oil is filled to the primary chamber 45, pressurized oil passage 3, and the cylinder 6 from the hydraulic pump 1 via the check valve 2 until a specified pressure is reached.

With this filling of pressurized oil to a specified pressure, the main valve element 11 and the pilot valve element 12 are allowed to retreat to the pressure setting chamber 35 side opposing to the energizing means 49, and the support seat 47 is received with the set pressure adjusting screw 48 and stopped at the midway point. Thereafter, they retreat further opposing to the energizing means 13, and are stopped by bringing the end wall 52 on the pressure setting chamber 35 side of the guiding tube 42 of the main valve element 11 and the end wall 25 on the pressure setting chamber 35 side of the extension pipe section 31 of the stem 25 of the pilot valve element 12 in contact with the end wall 44 of the pressure setting chamber 35 as shown in FIG. 2. In this event, it is the energizing means 26 and the energizing means 13 that energize the main body 24 of the pilot valve element 12 related to the relief pressure setting, and with these two energizing means, the main body 24 of the pilot valve element 12 is brought into contact with the pilot valve seat 18 of the main valve element 11 and stopped, thereby setting the relief pressure. With the pilot valve closed, the main body 24 of the pilot valve element 12 related to relief pressure setting receives pressure with the doughnut-ring-form pressure bearing area formed between the pilot valve seat 18 and the stem 29.

When internal pressure of the primary chamber 45 is boosted to a pressure lower than the specified pressure after pressurized oil is filled to a specified pressure, the pilot valve is not opened but if internal pressure of the primary chamber 45 exceeds the specified pressure, the oil pressure thrust which the main body of the pilot valve element 12 receives exceeds the energizing force of the energizing means 26 and the energizing means 13, and the main body 24 of the pilot valve element 12 separates from the pilot valve seat 18, for example, as shown in FIG. 3, and the pilot valve opens.

When the pilot valve retreats on the pressure setting chamber 35 side and opens, the pressurized oil of the primary chamber 45 flows into the pilot chamber 51 but if internal pressure of the primary chamber 45 gradually increases and exceeds the specified pressure, the pilot valve opens only slightly, and the main valve element 11 hardly operates, and the main valve hole 22 does not open, and pressurized oil flowing into the pilot chamber 51 because of a slight opening of the pilot valve is released from the temperature compensation orifice 23 to the secondary chamber 46, preventing internal pressure of the primary chamber 45 from exceeding the specified pressure. As against this, if internal pressure of the primary chamber 45 suddenly rises and instantaneously releases a large flow rate exceeding the specified pressure, when the pilot valve opens and pressurized oil of the primary chamber 45 begins flowing into the pilot chamber 51 as shown in FIG. 3, pressure is suddenly received by a thick-width doughnut-ring-form large pressure bearing area in the valve opening direction formed between the large diameter section 17 of the main valve element 11 with the main body 24 of the pilot valve element 12 slidably internally fitted and the stem 29 by the flow of pressurized oil into the pilot chamber 51 at the start of the valve opening, and a large valve opening thrust is instantaneously generated. Then, the pressurized oil rapidly works on the end face of the taper section 16 of the pilot chamber 51 with a large pressure bearing area generating a large hydraulic thrust on the primary chamber 45 side and that of the pilot valve seat 18 in place of the end face of the small-diameter cylinder section 19 with a large pressure bearing area generating a hydraulic thrust in the secondary chamber 46 side. A great hydraulic thrust in the primary chamber 45 side direction is instantaneously generated. The main body 24 of the pilot valve element 12 rapidly opens, and the main valve element 11 rapidly moves fully to the primary chamber 45 in the direction opposite to the pilot valve element 12 as shown in FIG. 4, rapidly opening the main valve hole 22 fully from both directions opposite to the pilot valve element 12, and releasing pressurized oil of a large flow rate exceeding the specified pressure of the primary chamber 45 rapidly from the main valve hole 22 to the secondary chamber 46.

For example, if internal pressure of the primary chamber 45 at no load is slightly higher than the specified pressure by the increase of oil temperature, internal pressure increases to a slightly higher value than the specified value at full load, the pilot valve opens and with this small-flow rate relief, oil pressure of the primary chamber 45 lowers to the specified value. In this case, the pilot valve element 12 and the pilot valve seat 13 are not extended more than the condition shown in FIG. 3, the pilot valve element 12 advances by the energizing force of the energizing means 13 and the retainer spring 49 to meet a lowering of the internal pressure of the primary chamber 45, and the pilot valve closes.

For example, if internal pressure of the primary chamber 45 still rapidly increases to a pressure higher than the specified pressure as in the case when overload is generated, oil pressure of the primary chamber 45 goes no lower to the specified value by the said small-flow rate relief. In this event, the main valve element 11 is driven to the primary chamber 45 side by the differential pressure exerted to the taper section 16 and the small-diameter cylinder section 19 and the difference of pressure bearing area and at the same time, because the pressure bearing area is extended by the opening of the pilot valve, the pilot valve element 12 retreats to the pressure setting chamber 35 side further rapidly, and the pilot valve element 12 and pilot valve seat 18 as well as the main valve element 11 and the pilot valve element 12 extend more than the condition shown in FIG. 3, and the main valve hole 22 is opened as shown in FIG. 4 and relief of a large flow rate takes place.

Because the passage of pressurized oil flowing into the taper section 16 when the pilot valve opens is formed between the taper section 16 at which the inside diameter continuously and gradually increases and the tip end 27 of the pilot valve element 12 where the outside diameter continuously increases, the passage cross section continuously and slowly increases and turbulence becomes difficult to be generated. Consequently, pressure loss resulting from the generation of turbulence is reduced, internal pressure of the taper section 16 rapidly increases to rapidly move the main valve element 11 to the primary chamber 45 side, and the main valve is allowed to quickly open to increase the response when a large flow rate is released. At the same time, the of relief pressure can be suppressed to a small level, thereby minimizing the variation of relief pressure due to the variation of the flow rate and improving stability.

Because the pressurized oil passage formed in the main valve element 11 when the main valve opens extends from the small-diameter section 15 to the main valve hole 22 of the large-diameter section 17 via the umbrella-form passage formed between the taper section 16 and the tip end 27 of the pilot valve element 12, the flow is not suddenly bent and the passage resistance is reduced. Consequently, pressure loss due to passage resistance is reduced, further improving response and stability.

As described above, the first relief valve according to this invention can follow an increase of pressurized oil of dramatically great flow rate and improves the relief performance because the small-diameter section of the oil passage of the main valve element is followed by the large-diameter section by tapering, the pressure bearing area of the pilot valve rapidly increases because of a slightly small opening of the pilot valve which seals the pilot valve seat mounted at the connections between the small-diameter section and the taper section, the response is improved and relief pressure setting accuracy is improved by rapid valve opening, and in addition, the opening pressure bearing areas of the main valve rapidly increases and opens rapidly and fully in the direction opposite to the pilot valve as soon as the pilot valve opens to rapidly open the main valve hole.

In addition, because the small-diameter section of the oil passage of the main valve element is followed by the large-diameter section by tapering and the cross sectional area of the passage of pressurized oil flowing out from the pilot valve seat mounted at the connections between the small-diameter section and the taper section is gradually changed, turbulence is difficult to be generated and at the same time the bend of the pressurized oil passage becomes lenient to decrease pressure loss. As a result, resistance to the main valve element operation decreases and response can be increased, and at the same time the change of the relief pressure to the change of flow rate can be reduced to improve the stability.

In the first relief valve according to this invention, in particular, if the tip end of the pilot valve is formed in a cone or frustum of a cone with a taper circumferential surface corresponding to the taper section of the oil passage, the increase in passage cross sectional area of the taper section of the oil passage can be alleviated and at the same time oil flowing out from the pilot valve seat around the taper circumferential surface can be guided along the taper section, enabling a further reduction of pressure loss and a further improvement of a response and stability.

In the first relief valve according to this invention, if a main valve hole is formed in the circumferential wall of the large-diameter cylinder section of the main valve element, the external circumferential edge of the pilot valve element is brought slidably and internally into contact with the large-diameter cylinder section and the pilot valve element is allowed to open or close the oil passage between the pilot valve seat and the main valve hole, the main valve element can be opened only by depending on the relative position of the pilot valve element and the main valve element, the opening delay of the main valve with respect to the opening of the pilot valve can be reduced, and the response can be further improved.

The second relief valve according to this invention enables formation of the sliding surface of the sealing member for an oil tight sealing the clearance between the main valve element and the valve stem internal circumferential surface with a low-sliding-resistance material, which is held by one of the external circumferential surfaces of the main valve element and the internal circumferential surface of the valve stem for storing this and is brought slidably into contact to the other, reducing resistance to the operation of the main valve element to increase the response and reducing the relief pressure to change the flow rate to improve the stability.

In the temperature compensation system according to this invention, when oil temperature rises and the oil pressure abnormally rises above the specified pressure, the pilot valve slightly opens the pilot valve seat, traces of pressurized oil is allowed to pass the temperature compensation orifice and easily discharged to the drain passage, and then the pilot valve closes to prevent the main valve from operating, and in this way, a malfunction can be easily prevented when oil temperature rises.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A relief valve comprising a main valve element directly including a pilot valve element in a valve case and a pilot valve which is opened by isolating the pilot valve element from a main valve element by oil pressure exerted on the pilot valve element from an oil passage formed in the main valve element while resisting an energizing means for energizing the pilot valve element wherein oil pressure is exerted on the pilot valve element side of the main valve element by the opening of the pilot valve to drive the main valve element in the valve opening direction away from the pilot valve element, characterized by:

an oil passage of the main valve element formed by holes with different diameters with a small-diameter section, a tapered section which continuously follows the small-diameter section with the diameter gradually increasing, and a large-diameter section which continuously follows the tapered section;

a pilot valve seat wherein the pilot valve element sealably comes into contact with the connections between the small-diameter section and the tapered section; and an external circumferential border of the pilot valve element slidably fitted to the large-diameter cylinder of the main valve element, thereby rapidly increasing the opening pressure bearing area when the valve opens.

2. The relief valve according to claim 1, wherein a tip end of the pilot valve is formed in a cone with a tapered circumferential surface corresponding to the tapered section of the oil passage.

3. The relief valve according to claim 2, wherein a main valve hole is formed on a circumferential wall of the large-diameter cylinder of the main valve element, the external circumferential border of the pilot valve element is slidably fitted to the large-diameter cylinder and the pilot valve element is allowed to open or close the oil passage between the pilot valve seat and the main valve hole.

4. The relief valve according to claim 2, comprising a pilot chamber formed by the pilot valve element directly included between a pilot valve seat of the main valve element and a main valve hole and slidably fitted at the large-diameter cylinder and a temperature compensation orifice in free communication with a drain passage formed downstream from a main valve hole mounted at the main valve element.

5. The relief valve according to claim 1, wherein a main valve hole is formed on a circumferential wall of the large-diameter cylinder of the main valve element, the external circumferential border of the pilot valve element is slidably fitted to the large-diameter cylinder and the pilot valve element is allowed to open or close the oil passage between the pilot valve seat and the main valve hole.

6. The relief valve according to claim 5, comprising a pilot chamber formed by the pilot valve element directly included between a pilot valve seat of the main valve element and a main valve hole and slidably fitted at the large-diameter cylinder and a temperature compensation orifice in free communication with a drain passage formed downstream from a main valve hole mounted at the main valve element.

7. The relief valve according to claim 1, comprising a pilot chamber formed by the pilot valve element directly included between a pilot valve seat of the main valve element and a main valve hole and slidably fitted at the large-diameter cylinder and a temperature compensation orifice in free communication with a drain passage formed downstream from a main valve hole mounted at the main valve element.

8. The relief valve according to claim 1, wherein a tip end of the pilot valve is formed as a frustum of a cone with a taper circumferential surface corresponding to the tapered section of the oil passage.

9. The relief valve according to claim 1, comprising the pilot chamber formed by a pilot valve element directly included between a pilot valve seat of the main valve element and a main valve hole and slidably fitted at the large-diameter cylinder and a temperature compensation orifice in free communication with a drain passage formed downstream from a main valve hole mounted at the pilot valve element which is a part forming the pilot chamber.

* * * * *